Jan. 10, 1961     W. B. BRIGGS     2,967,678
DUCT AIRFLOW STABILIZING AND AIRCRAFT BRAKING MEANS
Filed Aug. 13, 1956     2 Sheets-Sheet 1

INVENTOR.
William B. Briggs
BY
W. R. Robertson
AGENT

Jan. 10, 1961 W. B. BRIGGS 2,967,678
DUCT AIRFLOW STABILIZING AND AIRCRAFT BRAKING MEANS
Filed Aug. 13, 1956 2 Sheets-Sheet 2

INVENTOR.
William B. Briggs
BY
W. R. Robertson
AGENT

United States Patent Office 2,967,678
Patented Jan. 10, 1961

2,967,678

DUCT AIRFLOW STABILIZING AND AIRCRAFT BRAKING MEANS

William B. Briggs, Dallas, Tex., assignor to Chance Vought Aircraft, Incorporated, Dallas, Tex., a corporation of Delaware Filed Aug. 13, 1956, Ser. No. 603,644

24 Claims. (Cl. 244—53)

This invention relates to aircraft intended for flight at supersonic velocities, and more particularly to a method and means useful in such an aircraft for effecting the application thereon of braking forces and for obviating violent airflow instabilities in a duct supplying air to means provided in the aircraft for propelling the same at supersonic velocities.

In an aircraft having a duct for supplying air to a power plant provided in the aircraft for driving the same at supersonic velocities, airflow in and about the duct ordinarily is relatively smooth and stable during supersonic flight in which the capacity of the duct (that is, the mass-flow of air which the duct seeks to deliver to the power plant) does not critically exceed the mass-flow receivable by the engine. When duct capacity does critically exceed engine air demand, the comparatively stable airflow may be replaced by violent airflow instabilities characterized by repeated pressure and flow changes within the duct, periodic or erratic appearance and disappearance in serial order of a train of normal shock waves in the neighborhood of the duct inlet, and intermittent spillage of air out of the ram inlet of the duct and/or from the streamtube of air ahead of the inlet, the term "streamtube" being consistently employed herein to designate air moving supersonically toward the duct within a space whose cross-section is defined by an upstream projection of the inlet opening of the duct. The term "projected area," used below in association with the ram air inlets of ducts hereinafter discussed, will be understood where found to consistently indicate an area corresponding in size and shape to the inlet referred to and to lie either upstream of the inlet or downstream of the inlet within the duct.

Duct capacity may come to exceed, by a critical value, the engine air intake capacity when the supersonic velocity of the aircraft is increased without a corresponding increase in power plant air consumption, and by decreasing the rate of air intake of the power plant without simultaneously effecting a corresponding decrease in supersonic Mach number. As examples of these occurences, the former may occur in a dive in which the power plant is or is not throttled, and the latter when the power plant is throttled, during supersonic flight in any attitude, to an air intake rate sufficiently below the duct capacity. Duct airflow instabilities likely to occur under such conditions are apt to cause malfunctioning and damage in the power plant and other equipment of the aircraft, may induce large drag forces, and often may become so violent as to precipitate serious structural damages ranging to and including destruction of the aircraft.

Many aircraft are provided with dive or speed brakes which, when placed in operation, effectively impose braking forces on the aircraft on which they are installed. Even with the dive brakes extended, however, the operator of such a vehicle may not reduce the throttle setting of the aircraft power plant as long as the aircraft moves at a Mach number such that any throttling action would reduce the engine air demand critically below the duct capacity. As helpful as a reduction in engine thrust would be at such a time in slowing the aircraft, a reduction of throttle setting must be deferred until the dive or speed brakes have sufficiently slowed the aircraft, and even then must be accomplished with caution lest the mass-flow of air into the power plant be reduced too quickly relative to supersonic Mach number.

Dive brakes have been provided in many locations on aircraft; yet, their location in a suitable position or positions on an aircraft is frequently a problem. Except for the resulting influence upon duct airflow, it would in many cases be found advantageous to mount a dive brake upstream of a power plant air duct. It has however been generally believed that the dive brake's influence on duct airflow would invariably be disadvantageous, and such locations have accordingly been avoided, much of the novelty of some dive brake arrangements lying in the manners employed therein for avoiding interference of dive brakes with duct airflow.

It is, accordingly, greatly advantageous to provide means which may be mounted in the projected area of the inlet of a duct supplying air to a power plant of an aircraft, said means functioning as a dive brake and in addition making possible the throttling of the power plant as desired at any Mach number and permitting the aircraft to dive or otherwise fly at any speed regardless of throttle setting without danger of excessive duct airflow instabilities. The provision of such means is further advantageous where it is desired to sharply reduce the power plant air intake relative to Mach number without much or any slowing of the aircraft (for example, in a high-speed dive at reduced power setting), the smooth drag imposed upon the aircraft by such means being an entirely acceptable alternative to the high, varying drag and the other more serious consequences of duct airflow instabilities of the above-described sort.

It is, accordingly, an object of this invention to provide, in association with an inlet opening of an air duct supplying air to a propulsive means mounted in an aircraft intended for supersonic flight, a means for preventing violent instabilities in airflow internally and externally of said duct when mass-flow of air into said propulsive means is reduced below the mass-flow of air suppliable by said duct.

Another object is to provide means, of the character stated above, which prevents excessive instabilities in the duct airflow by inducing a normal shock wave upstream of the ram air inlet of the duct to slow air approaching the duct to subsonic speeds and thereby induce relatively steady spillage of air at and upstream of the duct inlet.

Still another object is to provide means, such as thus far stated, the operation of which is selective for allowing maximum airflow into the duct and for inducing air spillage in the manner stated.

Yet another object is to provide means of the above-stated character including a body extendible when desired from said aircraft for producing said normal shock wave ahead of said duct inlet.

A further object is to provide such a body which, while being extendible from the aircraft for producing said normal shock wave, is also retractable to a position in which airflow into said duct is not significantly reduced thereby.

A still further object is to provide means for holding said body in said position in which airflow into said duct is not significantly reduced thereby, and for effecting extension of said body into a position in which, as above stated, a normal shock wave is induced ahead of said inlet opening of said duct.

An additional object is to provide means such as thus far stated in which the extendible body is effectively constrained to a safe rate of extension and in which the body is stopped and held upon arrival at its fully extended position.

Another object is to provide efficient means for bracing the extendible body when the latter is extended from the aircraft.

Yet another object is to provide means such as thus far stated which are effective in applying braking forces on the aircraft in supersonic flight.

Other objects and advantages will be apparent from the specification and claims and from the accompanying drawings which illustrate an embodiment and several modifications of the invention.

Briefly described, the invention comprises a shock wave inducing means mounted on an aircraft and movable relative thereto to a first position wherein it permits maximum airflow through the ram air inlet of a duct mounted on the aircraft for supplying air to means for propelling the aircraft, and to a second position wherein a normal shock wave is engendered upstream of the ram air inlet. Means provided for effecting movement of the shock wave inducing means between the above-described first and second positions thereof may also be effective in holding the shock wave inducing means in one or both of those positions. The invention may also include means for governing the rate of movement of the shock wave inducing means, for stopping it in its two positions, and for bracing it in its second position. The shock wave inducing member, in one form, is a plate-like member the forward face of which is impinged upon by airflow adjacent the inlet opening when the plate is extended. In another form of the invention, the shock wave inducing means comprises one or more elongated bodies movable together to a position wherein they extend in transverse relation to the duct and produce a normal shock wave ahead of the duct. To this construction may be added one or more members extending generally transversely of and movable with the elongated members mentioned above. When it is desired to provide a controlled increase of the aerodynamic drag upon the aircraft, and especially where it is desired to prevent the occurrence of violent airflow instabilities in the duct attributable to a reduction, when the aircraft is in supersonic flight, of the mass-flow of air consumable by the propelling means in relation to the mass-flow currently suppliable by the duct, the shock wave inducing means is moved to its second position. The resulting normal shock wave formed ahead of the inlet opening abruptly slows air flowing toward the duct to subsonic speeds, and air in excess of that consumable by the propelling means does not enter the duct, but spills around the inlet opening. Where used alone or in conjunction with dive brakes mounted in other locations on the aircraft, the shock wave inducing means is effective, when in its second position, for reducing the airspeed of the aircraft and for inducing a relatively steady spillage of air that otherwise would enter or seek to enter the air duct. Because of the spillage, the propulsive means of the aircraft may be throttled or otherwise adjusted to reduce its intake of air and hence its thrust, thus further aiding in the slowing of the aircraft. At the same time, serious duct airflow instabilities which otherwise might follow the reduction of the consumption of air by the propulsive means are avoided. Where under certain flight conditions utilized solely for preventing such instabilities, no need then existing or any desire being entertained for slowing the aircraft, operation of the normal shock wave inducing means for effecting air spillage will be found to impose little if any airspeed penalty in that the relatively steady drag forces imposed thereby will not greatly, if at all, exceed the erratic drag forces which would be imposed on the aircraft by the violent duct airflow instabilities which would occur if the air spillage were not effected.

Figure 1:
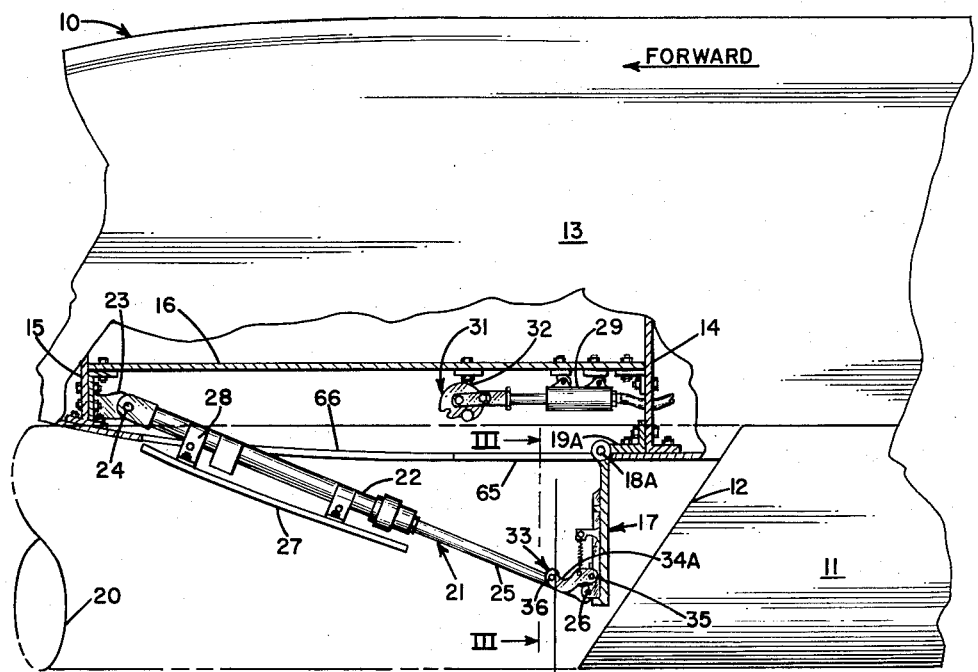
Figure 1 is a fragmentary side view of an aircraft showing a portion of the fuselage and the forward end portion of an air duct mounted thereon, a portion of the fuselage skin being cut away, and bulkheads and a floor of the fuselage being cut back along a longitudinal plane lying near the centerline of the fuselage to show components of the invention.

Referring now to the drawings, with initial reference to Figure 1, an aircraft with a fuselage 10 has an air duct with an open forward-end portion 11 lying beneath and adjacent the fuselage. The forward edge or rim 12 of the duct 11 defines a forwardly directed opening into which ram air from the airstream outside the aircraft is received, and some or all of the inducted air is delivered through the duct to a propulsive means, such as, for example, a jet engine, provided in the aircraft. The fuselage 10 has an external skin 13 whose internal structural members include an aft transverse bulkhead 14 located a short distance forward of the junction of the duct rim 12 and fuselage 10, a forward transverse bulkhead 15, and a horizontally disposed internal partition or floor 16 that extends across the bottom of the fuselage 10 and is attached at its forward and aft ends respectively to the forward and aft bulkheads 14, 15 against which the floor 16 should fit tightly enough to prevent the flow of any objectionable quantities of air therebetween. For the same reason, the lateral edges of the floor 16 should fit closely against the skin 13 throughout the interval between the two bulkheads 14, 15.

The normal shock wave inducing means of the present example comprises a generally plate-like body 17 pivotally mounted at one of its ends, by means of pivot pins such as 18A and brackets such as 19A, on the forward face of the aft bulkhead 14 in such position that the body 17 may be pivoted downwardly to a position wherein it extends outwardly from the fuselage 10 and lies athwart the stream-tube 20 of air flowing at supersonic rate toward the inlet opening defined by the rim 12. The means for governing the rate of extension of the normal shock wave inducing body 17 may comprise a snubber 21 having a barrel 22 pivotally mounted at its forward end on the forward bulkhead 15 by means of a bracket 23 and pivot pin or bolt 24 and provided with a piston rod 25 extensible from and retractable into the barrel 22 and pivotally connected at its free end to the plate-like body 17 by a pivot pin 26. A fairing 27 which corresponds in contour to the fuselage skin 13 at the bottom of the fuselage 10 is desirably provided on the snubber 21 and may conveniently be attached thereto by one or more clamps such as 28. The snubber 21 allows the rod 25 to be pulled outwardly relative to the barrel 22 only at a relatively slow rate and contains provisions for positively and firmly stopping the rod 25 when full extension thereof has been effected, full extension of the rod 25 corresponding to the position of full pivotal extension of the shock-wave inducing body 17 from the fuselage 10. The snubber 21 may thus not only serve to limit the rate of extension of the shock-wave inducing body 17, but may thus also stop the latter in its fully extended position and, while in that position, brace it against rearwardly urging aerodynamic forces.

The fuselage skin 13 has a first cut-out 65 which begins at the aft edge of the shock-wave inducing body 17, extends forward for a distance equal to or slightly greater than the length of the body 17, and is of such width as to snugly receive the body 17 when, as will be described, the latter is retracted. The skin 13 has a second cut-out 66 of proper dimensions for similar reception of the fairing 27. The cut-outs 65, 66 may be continuous at their respective forward and aft ends where, as in the example, the fairing 27 is located so as to lie closely against the forward edge of the body 17 when the latter and the fairing 27 are retracted.

The means for holding the shock-wave inducing means in the position occupied by the latter before its extension comprises, in the example referred to, an actuating cylinder 29 mounted, by means to be described, on the under side of the floor 16; a latching body 31 pivotally mounted by a bracket or arm 32 on the underside of the floor 16; and a plate linkage 33 comprising a left-hand arm 34A pivotally connected as by a pin 35 to the upper side of the plate 17 near the forward end thereof and bearing at its upper end a pin 36 engageable by the latching body 31.

Figure 3:
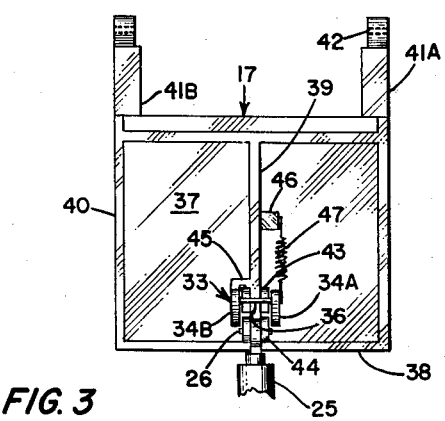
Figure 3 is an enlarged view, taken along line III—III of Figure 1, of the extendible body.

Referring now also to Figure 3, the plate linkage 33 further comprises a right-hand arm 34B which lies opposite and is substantially the counterpart of the left-hand arm 34A and which joins with the latter in bearing the latch pin 36. The plate-like body 17 of the particular example comprises a generally rectangular plate 37 preferably reinforced on its upper side by transverse ribs 38, a central longitudinal rib 39, and lateral longitudinal ribs 40. A pair of arms 41A, 41B of equal length extend upwardly from the upper edge of the plate 37 as viewed in its extended position, and these arms are drilled at their free ends as at 42 to receive pivot pins such as the pin 18A, a bracket such as 19A being required on the aft bulkhead for pivotally mounting each of the arms 41A, 41B. A boss 43 integral with the central longitudinal rib 39 receives the pivot pin 35 which mounts the arms 34A, 34B on respective sides of the boss. Forward of the boss 43 are a duplicate pair of ears 44 located on either side of the central rib 39 and, as desired, made integrally with the latter. The ears 44 form a fork into which the aft end of the piston rod 25 is attached by its pivot pin 26. Where it is desirable to provide a stop to limit forward pivoting of the linkage arms, such a stop may comprise a finger 45 rigidly attached to or integral with the central rib 39 and/or boss 43 and extending both upwardly and laterally therefrom to a point at which the free end of the finger 45 is struck by one of the arms 34A or 34B when the latter have been pivoted to the forward end of their required arc of pivotal motion. An anchor arm 46 which extends upwardly from the central rib 39 at a point forward of the arms 34A, 34B firmly engages near its free extremity an end of a coil spring 47, the other end of the spring being similarly engaged by one of the arms 34A or 34B at some distance above the pivot pin 35. The spring 47 should be strong enough to hold the arms 34A, 34B firmly against the stop 45 when the latch pin 36 is disengaged from the latching body 31.

Figure 2:
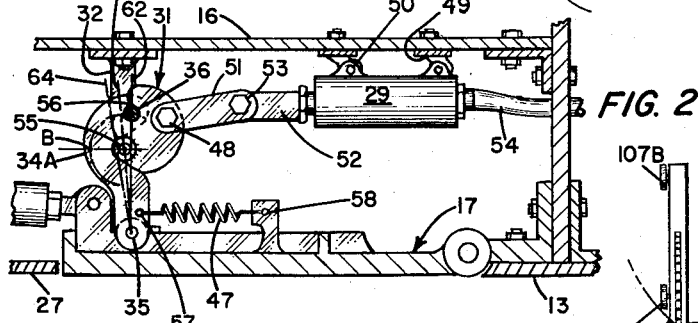
Figure 2 is an enlarged side view of the extendible body and of the means for locking and effecting extension thereof shown in Figure 1, the extendible body being shown in its position wherein no interference is exerted thereby on airflow entering the duct.

Referring now to Figure 2, the lock cylinder 29 of the example typifies any actuating mechanism well adapted to serve the functions, soon to be made apparent, of the cylinder 29 shown. The cylinder 29 is rigidly mounted on, for example, the floor 16 by a pair of brackets 49 and fasteners 50. A link 51 pivotally connected between the latching body 31 and the piston rod 52 of the lock cylinder 29 by fasteners 48, 53 is provided to allow for changes in angular relation between the rod 52 and body 31 when the rod is extended. The cylinder 29 of the example is of the conventional single-acting hydraulic type containing internally a spring which urges the piston rod 52 to a retracted position within the cylinder. Extension of the rod 52 is effected by pressure exerted by hydraulic fluid supplied to the cylinder 29 through a tube or hose 54 from a suitable source of hydraulic power when it is desired to unlatch and extend the plate-like body 17. Where it is desired to provide hydraulically powered retraction as well as extension of the piston rod 52, a double-acting cylinder may obviously be provided in the place of the cylinder 29.

The latching body 31 of the example comprises a plate whose near and far faces are generally parallel with the vertical centerplane of the aircraft. The plate 31 is mounted by a bolt or pin 55 on the arm 32 for pivoting forwardly from the position illustrated. The plate 31 has cut into one of its edges a notch 56 slightly wider and somewhat deeper than the diameter of the latch pin 36. A triangular relation exists between the pivot pin 55, notch 56, and rod link attaching pin 48, the pivot pin 55 being at the bottom point of the triangle and the notch 56 at the forward point. The notch 56 is cut in such a direction that, near its inner end, its lower wall is somewhat nearer the pivot pin 55 than is a point on that same wall near the outer end of the notch.

One of the link arms 34A or 34B is provided with a small hole such as 57 which receives the forward end of the spring 47, and the other end of the spring is hooked into an anchor arm hole 58.

The latching body 31, spring 47, cylinder 29, rod link 51, and plate link arms 34A, 34B together form an overcenter latching mechanism for an understanding of which no further explanation will be required beyond pointing out, as is accomplished in later paragraphs, some of the details of its operation.

Figure 4:
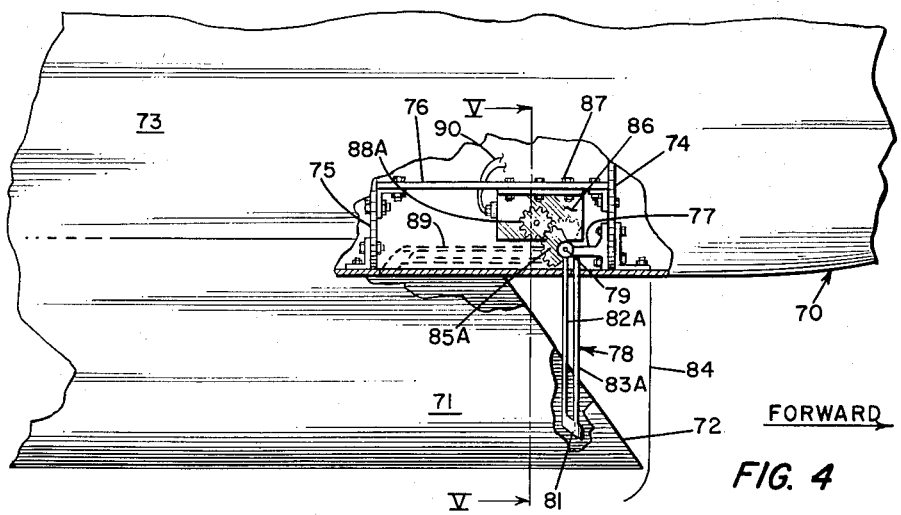
Figure 4 is a side view of an aircraft showing a portion of the fuselage and the forward end of an air duct mounted thereon, some of the fuselage skin and duct wall being cut away to show typical components comprised by a modification of the invention.

Figure 4 represents an aircraft having a fuselage 70, air duct forward portion 71 with a forward-end rim or edge 72, fuselage skin 73, forward and aft bulkheads 74, 75, and floor 76 equivalent to the corresponding items already described in connection with Figure 1. A fitting 77 provided on the aft face of the forward bulkhead 74 supports the near side of a shock-wave inducing body 78, the far side of the same being supported by a similar far-side fitting not shown. The body 78 is pivotally attached to the fitting 77 and its far-side counterpart by pivot pins such as 79.

Figure 5:
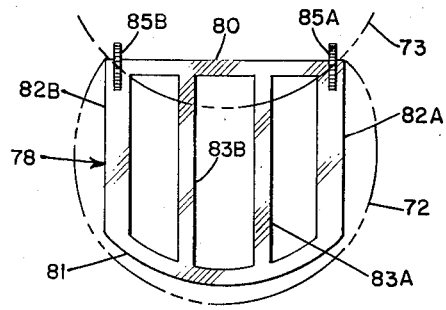
Figure 5 is a view, taken along the line V—V of Figure 4, of the shock wave inducing body of Figure 4.

Referring also to Figure 5, in which the shock-wave inducing body 78 is shown in its extended position and the outline of the duct rim 72 and adjoining fuselage skin 73 are shown in dotted line, the body 78 comprises an upper transverse bar 80 from which depend, as viewed in the drawing, a plurality of substantially vertical bars 82A, 82B, 83A, 83B joined by a lower transverse bar 81. The width, length, and spacing of the above bars may vary, but their total effect should be such as to induce efficiently a normal shock wave such as 84 ahead of the duct rim 72 when the body 78 is extended during supersonic flight. Thus, for example, the outer pair of vertical bars 82A, 82B may be of one width, while an inner pair of vertical bars 83A, 83B may be of another, and the lower transverse bar 81 may be of still another width. The lower bar 81, if brought vertically nearer the duct rim 72, may be narrower, and to achieve this nearness may be curved to lie approximately concentric with the neighboring lower-side contour of the duct wall 72. To insure a good flush fit of the lower bar 81 and skin 73 when the body 78 is retracted, the lower bar 81 also may be curved to match the curvature of the skin 73 at the bottom of the fuselage 10. The several bars described above may be of various cross-sectional shapes, such as circular, ovoid, rectangular, L-section, T-section, etc., and are curved along their length as necessary for securing a satisfactorily good retracted-position fit of the bars with the fuselage skin 73. Rigidly mounted on or integral with the upper end of each outer bar 82A, 82B is a sector gear 85A or 85B; these gears, which are counterparts, are aligned parallel with the centerplane of the aircraft, and their teeth point generally rearwardly.

An electrically driven actuator 86 is mounted by fasteners such as 87 on the bottom of the floor 76 and is provided with an external, near-side gear 88A which mates with and drives the near-side sector gear 85A. A gear (not shown) similar to the gear 88A and made to rotate in synchronization with the latter is preferably provided on the far side of the actuator 86 for driving the far-side sector gear 85B.

The retracted position of the shock-wave inducing body 78 is generally indicated in dotted lines at 89. Cut-outs, omitted for clarity from the drawing, must of course be provided in the fuselage skin 73 to accommodate the bars 80, 81, 82A, 82B, 83A, 83B when retracted, in which position it is desirable that the outer surfaces of the bars should be flush with the outer surface of the skin, which should fit snugly around the outlines of the bars.

The actuator 86 is supplied with electrical power through leads such as 90, and should be provided internally or externally with one or more limit switches of any suitable, well-known sort which will efficiently limit the range of rotation of the actuator gears, typified by 85A, in both directions. The actuator 86 should have a brake, preferably internal, for holding the gear 85A immobile in any position occupied by the same when the actuator is deenergized.

Figure 6:
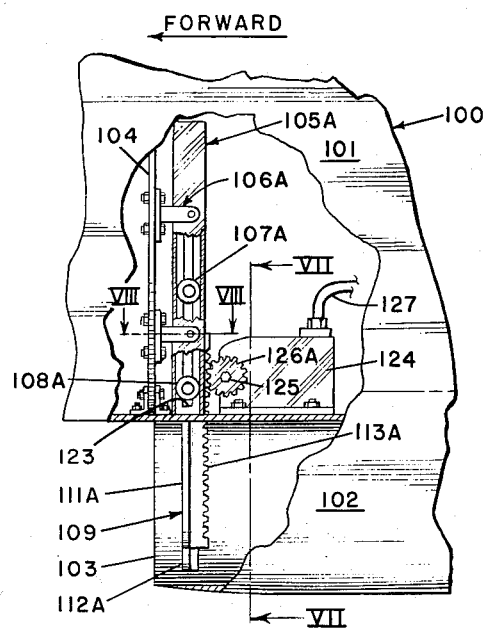
Figure 6 is a view, similar to Figure 4, of another modification of the invention, the forward end of the duct being cut away to the centerline thereof.

A further modification of the invention is depicted in Figure 6, wherein, somewhat as in the previous examples, a fuselage 100 is provided with an external skin 101, a duct forward portion 102 with a forward-end edge or rim 103, and a transverse fuselage bulkhead 104 located slightly aft of the duct rim 103. A vertical track 105A is mounted by fittings 106A and suitable fasteners on the aft face of the bulkhead 104 on the left-hand side of the fuselage 100, and a matching track, not shown, is similarly mounted on the bulkhead 104 on the right-hand side of the fuselage. Reciprocally movable in a vertical direction within the track 105A is a pair of rollers 107A, 108A mounted on the left-hand side of a shock-wave inducing means 109 described below, a second pair of rollers (not shown in Figure 6) being mounted on the right-hand side of the shock-wave inducing means in positions symmetrically opposite the left-hand rollers 107A, 108A.

Figure 7:
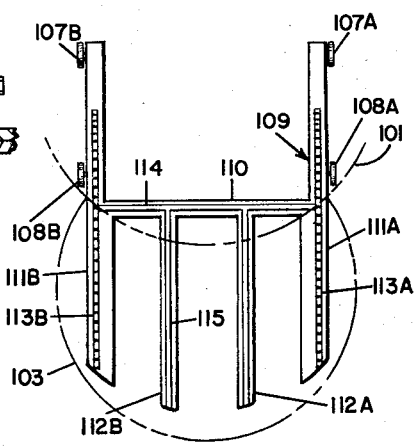
Figure 7 is a view of the shock wave inducing means of Figure 6 taken along line VII—VII of Figure 6.

With added reference to Figure 7, the shock-wave inducing means 109 has a transverse bar 110 from which vertically depend, as viewed in Figure 7, an outer pair of bars 111A, 111B and an inner pair of bars 112A, 112B. Each outer bar 111A or 111B has along its aft side a rearwardly extending flange which is toothed to form a gear rack 113A or 113B. Reinforcing, aft-edge flanges may be provided as at 114 on the upper bar 110 and as at 115 on the two inner bars 112A, 112B. The rollers 107A, 107B, 108A, 108B are rotatably mounted on the outer edges of the left- and right-hand outer bars 111A, 111B, the upper rollers 107A, 107B being located near the top end of the bars and the rollers 108A, 108B being located, for example, a little above the transverse bar 110. The bottom ends of the vertical bars 111A, 111B, 112A, 112B are shaped to match the contour of and lie flush with adjoining areas of the fuselage skin 101 when the shock wave inducing body 109 is fully retracted.

Figure 8:
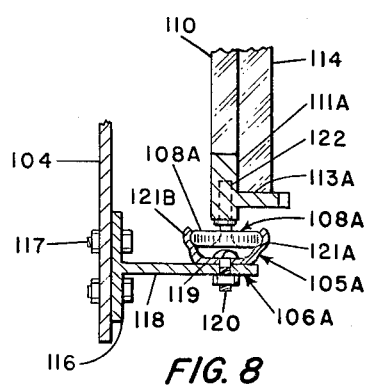
Figure 8 is a fragmentary view, taken along line VIII—VIII of Figure 6, showing the guide track, part of the shock wave inducing means, and one of the rollers.

With added reference to Figure 8, the track support fitting 106A has a foot portion 116 rigidly attached by fastening means 117 to the bulkhead 104 and further has a rearwardly extending arm 118. The track 105A has a web 119 rigidly attached by suitable fastening means 120 to the inboard face of the fitting arm 118, and has a pair of parallel, matched, inwardly extending forward and aft flanges 121A, 121B whose inner faces are shaped to receive the left-hand rollers 108A, 108B and to allow motion of the same longitudinally of the track. The track 105A should extend near enough to the bottom of the fuselage 100 to permit adequate extension of the shock-wave inducing means 109, and similarly should extend upwardly far enough into the fuselage to permit full retraction of the shock-wave inducing body. As shown in Figure 8, the roller 108A is rotatably attached to the outboard edge of the left-hand outer bar 111A by an appropriate fastener such as a screw 122, the same mode of attachment being typical of the remaining rollers 107A, 107B, 108B. The forward and aft flanges 121A, 121B of the left-hand track 105A may be bridged at or near their lower ends, as shown in Figure 6, by a connecting piece 123 which is struck by the lower roller mounting fastener 122 (Figure 8) when the body 109 reaches its position of full extension and thus serves as an extended-position stop for the body 109. Similar stop means may be provided at or near the upper end of the left-hand track 105A and in corresponding locations on the right-hand track (not shown) for limiting upward and downward motion of the shock-wave inducing body 109.

Referring to Figure 6, an electrically driven actuator 124 is rigidly mounted in the fuselage 100. The actuator 124 may be mounted on the skin 102 in the event that the latter is rigid and thick enough for the purpose, or other convenient means of rigidly mounting the actuator 124 may be provided. The actuator 124 of the example is reversible and is provided with a shaft 125 which extends transversely of the fuselage 100 through the actuator case and has rigidly mounted on its left-hand end a near-side gear wheel 126A which engages the toothed edge of the left-hand gear rack 113A. A matching, far-side gear wheel (not shown) is mounted on the right-hand end of the shaft 125 in a position wherein it engages the right-hand gear rack 113B (Figure 7). The actuator 124 (Figure 6) receives electrical power through leads 127 for driving the gear 126A and its counterpart for effecting extension and retraction of the shock-wave inducing body 109. The actuator 124 should have limit switches, or the equivalent, which will prevent jamming of the shock-wave inducing body 109 against the track stops 123, at either end of its range of travel, in such a way as to be injurious to the tracks (left-hand track 105A shown), shock-wave inducing body 109, or actuator 124. The actuator 124 should be provided with a braking arrangement of any suitable sort which will hold the gear 126A and its far-side counterpart in any position in which the gear is stopped by deenergization of the actuator. Cut-outs (not shown) which lie in register with and closely conform to the shape of the bars 111A, 111B, 112A, 112B should of course be provided in the skin 101 to permit extension of the shock-wave inducing body 109 therethrough.

In all the above-described forms of the invention, it is contemplated that suitable control and power means be provided for governing energization of the several items designated for effecting actuation of the normal shock wave inducing means. Thus, the hydraulic line 54 of the lock cylinder 29 of Figures 1 and 2 must be selectively connectable through a control valve to a pressure port of a hydraulic pressure source provided in the aircraft. The actuator 86 of Figure 4 must be connected through its leads 90 to a suitable switch or equivalent electrical control device by means of which the actuator may be connected as desired to a source of electrical power for causing the actuator gear 88A to rotate in either direction, and similar control and power means must be provided for the actuator 124 of Figure 6. A number of hydraulic and electrical control and motor devices suitable for these purposes are generally well known, and accordingly are not shown or further described herein.

Before flight of the aircraft of Figure 1, the shock-wave inducing body 17 of Figure 1 is manually pivoted forwardly and upwardly about its mounting pins (typified by 18A) until, as shown in Figure 2, it fills the cut-out 65 and lies flush with the skin 13. Connected to the body 17 by the pin 36, the snubber piston rod 25 is moved forwardly and upwardly by the body 17 and thereby forced to its retracted position within the snubber barrel 22, and the latter is at the same time pivoted on its mounting pin 35 upwardly into the fuselage into a position wherein the fairing 27 fills the cut-out 66 and lies flush with the skin 13. In their retracted position, the body 17 and fairing 27 thus serve to complete the lower surface of the aircraft in the area of the cut-outs 65, 66, into which they fit closely enough to form a suitably smooth fuselage contour. Any air which in flight may leak inwardly past the body 17 and fairing 27 is substantially contained and prevented from flowing through the fuselage interior by the floor 16 and forward and aft bulkheads 15, 14.

With the lock cylinder 29 extended manually or hydraulically, before retraction of the body 17, to a position wherein the latching body notch 56 (Figure 2) lies approximately at point B, the linkage arm 34A is manually pushed forward against tension of the spring 47 to a point where, as the body 17 is retracted, the latch pin 36 enters the notch 56. The mechanical or hydraulic pressure holding the locking cylinder piston rod 52 is then removed to allow the internal spring of the lock cylinder 29 to rotate the latching body 31 rearwardly for holding the notch 56 about the latching pin 36 as the latter is moved upwardly by complete retraction of the shock-wave inducing body 17. The body 17 arrives at a position flush with the skin 13 as the latch pin 36 arrives at the line 64. Pulled rearwardly by the internal spring of the cylinder 29, the latching body 31 and latch pin 36 continue upwardly and rearwardly until they arrive at the line 63, at which time the pins 35, 55, and 36 are in alignment and the latch pin 36 lies a short distance above its position normally occupied when the body 17 is fully retracted, the extra upward movement of the latch pin 36 being effected against forces causing slight, temporary deformations of the shock-wave inducing body 17 and of the link arms 34A, 34B. Continued motion of the lock cylinder piston rod 52 to its fully retracted position rotates the latching body 31 to a position wherein the latch pin 36 moves past the line 63 to the line 62. In moving to this position, the latch pin moves downward to relieve substantially all the forces producing temporary deformation of the body 17 and link arms 34A, 34B. Since forces sufficient to again effect temporary deformation of the body 17 and arms 34A, 34B and to neutralize the rearwardly urging force exerted by the internal spring of the locking cylinder 29 must be overcome in order to rotate the latch pin 36 forwardly past the line 63, the latching body 31 and pin 36 are not affected by accelerations within a range of magnitude withstandable by the fuselage 10, and the shock-wave inducing body 17 remains safely locked in its flush position until the lock cylinder 29 is actuated for rotating the latching body 31 forwardly.

During supersonic flight in which the mass-flow of air consumed by the engine is not critically smaller than the mass-flow suppliable by the duct 11, the normal shock-wave inducing means 17 is left in its flush position shown in Figure 2, and substantially all the air passing through the streamtube 20 enters the inlet opening defined by the rim 12, particularly where the geometry of the inlet 12 and/or fuselage 10 is such as to induce one or more efficiently placed oblique shock waves across the streamtube 20 upstream of the inlet 12. Before the engine is throttled or the airspeed of the aircraft increased to a point at which violent duct airflow instabilities would be likely to occur in the duct 11, hydraulic pressure is applied to the cylinder 29 through the line 54 to effect extension of the piston rod 52 of the latter, thus rotating the latching body 31 forwardly, moving the latch pin 36 forwardly and downwardly, and implementing extension of the shock-wave inducing body 17 to a point where the latch pin 36 becomes disengaged from the notch 56. At this time, the forward edge of the shock-wave inducing body 17 lies somewhat below the skin 13. Thus extended into the streamtube 20, forces imposed by ram air on the upper face of the body 17 strongly urge the latter to pivot downwardly and aft on the pin 18A. These forces are resisted by the snubber 21, which allows motion of the body 17 at a controlled, safe rate to its position of full extension athwart the streamtube 20. At this point, the piston rod 25 reaches its limit of outward travel from the barrel 22 and stops the body 17, meanwhile bracing the body 17 against air loads tending to force it rearwardly.

With the normal shock-wave inducing body 17 extended athwart the streamtube 20, a normal shock wave 30 is made to stand forward of the body 17 across the inlet opening 12 (that is, cutting across the streamtube 20). This shock wave 30 abruptly slows the air passing through it to subsonic speeds relative to the inlet 12. Some of the slowed air enters the duct inlet 12, the amount inducted being a function of engine air demand; the rest, no longer moving supersonically, spills around the periphery of the duct 11 upstream of the inlet 12. As a consequence, air in excess of engine air demand is not rammed into the duct 12, and airflow within the latter is stabilized.

A smooth but considerable drag is imposed upon the aircraft as a result of extension of the body 17, formation of the normal shock wave 30, and the air spillage just described. As it is dependent upon extension of the body 17, this drag may be imposed upon the aircraft under the control and at the will of the operator thereof, and may safely and effectively be utilized as a braking force on the aircraft. By contrast, the uncontrolled drag forces which would occur if the body 17 were not extended are not safely available for braking the aircraft since the violent pulsations and intermittent air spillages attending such drag forces could seriously impair the functioning of the aircraft and even precipitate its mid-air disintegration.

In certain cases, however, such as in high-speed dives, the extension of the body 17, while initiating a smooth drag felt by the aircraft, may none the less act not to penalize the airspeed of the vehicle but, where gravitational and other forces are sufficiently large to result in further increase in airspeed, may enable the aircraft to fly safely at much higher speed than otherwise would be the case. If the body 17 were not extended, safe flight would be limited to a speed under that at which excessive instabilities would be initiated; at higher speeds, even though the aircraft were not damaged or destroyed, the uncontrolled, erratic drag accompanying the airflow instabilities which would occur would substantially equal of exceed the smooth, readily tolerated drag accompanying extension of the body 17.

When extended as shown, the normal shock wave inducing body 78 of Figure 4 induces in supersonic air approaching the inlet 72 a normal shock wave standing, for example, ahead of the duct 71 at 84. This shock wave 84, like the shock wave 30 of Figure 1, sets up a spillage around the outside of the inlet 72 of air in excess of that consumable by the engine receiving air from the duct 71, and causes added drag to be imposed upon the aircraft which is useful in slowing the same.

When the actuator 86 is energized through one or more of the leads 90 for causing the gear 88A and its far-side counterpart to rotate at a suitable rate in, as viewed, a counterclockwise direction, the body 78 pivots upwardly and rearwardly at a rate governed by the actuator until the bars 81, 82A, 82B, 83A, 83B enter the recesses or cut-outs provided for them in the skin 70 and lie flush with the latter. At this point, a limit switch of the actuator 86 stops the actuator, whose brake holds the gear 88A immobile and locks the body 78 in its retracted position wherein it lies substantially outside of and does not interfere with the streamtube of air entering the duct 71. Energization of the actuator 86 for clockwise rotation of the gear 88A causes the body 78 to pivot on the pin 79 to the extended position shown, at which position a limit switch of the actuator 86 stops the latter, which holds the gear 88A in the position in which the gear is stopped and locks the body 78 in its extended position. Air which might blow through the cut-outs provided in the skin 73 for the bars of the body 78 is contained and prevented from circulating through the fuselage 73 by the floor 76 and bulkheads 74, 75.

With reference to Figure 6, energization of the actuator 124 through one or more of the leads 127 as required for causing the gear wheel 126A and its far-side counterpart to rotate in a counterclockwise direction similarly results in downward motion being imparted at a suitable rate to the gear racks 113A, 113B of the shockwave inducing means 109 for extension of the latter, through the openings provided therefor in the skin 101, into and substantially across the duct 102 at a location briefly aft of the duct inlet opening defined by the rim 103. Where airflow in the throat of the duct 102 is supersonic, the shock-wave inducing means 109 induces a normal shock wave, similar to the shock waves 30 and 84 of Figures 1 and 4, which stands upstream of the duct; where duct airflow at the location of the means 109 is subsonic, the bars 111A, 111B, 112A, 112B of the latter further slow the subsonic air and thereby build up a pressure which is felt by supersonic air ahead of the rim 103, thus setting up a normal shock wave well upstream of the latter. In either event, spillage of air not consumable by the engine receiving air from the duct 102 is set up by the normal shock wave engendered by the means 109, and a resulting drag, well utilizable as a braking force, is felt by the aircraft. Energization of the actuator 124 in a manner causing the gear 126A to rotate in a clockwise direction results in retraction of the shock-wave inducing means 109 at a suitable rate into the fuselage 100 until the lower ends of the bars 111A, 111B, 112A, 112B are flush with the lower side of the skin 101 and hence outside airflow passing through the duct 102.

Operation of all the forms of the invention is such that, immediately after placing the normal shock wave inducing means in its position wherein controlled air spillage is effected, the engine may be throttled, thus reducing its propulsive force exerted on the aircraft. On the other hand, throttling is in no wise mandatory, and the engine controls may be left in their position occupied before such positioning of the normal shock-wave inducing means, or may even be moved to a higher setting if for any reason such should be advantageous: for example, so that the engine will quickly yield a high thrust when, as is possible in the arrangements of Figures 4 and 6, the normal shock wave inducing means is returned to its position permitting maximum airflow into the duct.

While only one embodiment of the invention has been shown, together with three modifications thereof, in the accompanying drawings, it will be evident that still other modifications are possible in the arrangement of the duct airflow stabilizing and aircraft braking means components without departing from the scope of the invention.

I claim:

1. In combination with an aircraft provided with a power plant for the supersonic propulsion thereof and with a duct for supplying air to said power plant, said duct having a connection with said power plant, a duct airflow stabilizing apparatus comprising: structure completely defining a ram inlet opening into said duct; means for engendering a normal shock wave well upstream of and across said inlet opening; said means being mounted on said aircraft and of separate identity from all of said structure defining said inlet opening, said means being movable relative to said structure to an extended position, said opening, when said means is in said extended position, having a projected area into which at least some of said means extends; whereby, when said first-mentioned means is extended, airflow upstream of said inlet opening is reduced to subsonic speeds and air is spilled around said inlet opening to reduce mass-flow into said duct below a level capable of supporting excessive duct airflow instabilities.

2. In combination with an aircraft provided with a power plant for the supersonic propulsion thereof and with a duct for supplying air to said power plant, said duct having a connection with said power plant, an arrangement comprising: structure completely defining a ram inlet opening into said duct, there being a streamtube of air approaching said duct at a supersonic rate and entering at least in part into said inlet opening; means for engendering a normal shock wave athwart said streamtube sufficiently upstream of said inlet opening to ensure a considerable spillage of airflow from said streamtube about said inlet opening, said means including at least one body mounted on said aircraft and extendible into said streamtube, said opening, when said body is extended, having a projected area into which at least some of said body extends; and means operative for eventuating extension of said at least one body into said streamtube and connected to said first-mentioned means at least before the latter is extended into said streamtube.

3. In combination with an aircraft provided with a power plant for the supersonic propulsion thereof and with a duct for supplying air to said power plant, said duct having a passage connected with said power plant, an arrangement comprising: structure completely bounding said passage and a ram inlet opening into said passage for receiving, in flight, a streamtube of air approaching and entering said inlet opening; normal shock-wave inducing means, of separate identity from said structure completely bounding said inlet opening and passage, mounted on said aircraft and extendible into said streamtube; means for eventuating extension of said shock-wave inducing means into said streamtube; and means in said aircraft for governing the rate of extension of said shock-wave inducing means, whereby, when said shock-wave inducing means is extended, a normal shock wave is formed across and air is spilled from said streamtube ahead of said inlet opening to reduce and stabilize the mass-flow of air into said duct.

4. In combination with an aircraft provided with a power plant for propelling said aircraft at supersonic speeds and with a duct for supplying air to said power plant, said duct having a passage connected with said power plant, an arrangement comprising: structure completely bounding said passage and a ram inlet opening into said passage for receiving, in flight, a streamtube of air approaching and entering said inlet opening; first means extendibly mounted on said aircraft and movable to a first position outside said streamtube said means being of separate identity from said structure completely bounding said inlet opening and passage; means selectively operable for holding said first means in said first position thereof and for eventuating extension of the same into and athwart said streamtube, whereby, when said first means is extended, a normal shock wave is engendered across said streamtube outside said duct and air moving at subsonic speeds relative to said duct is spilled from said streamtube upstream of said inlet opening.

5. An arrangement such as claimed in claim 4, said arrangement further including means connected to said aircraft and said first means and operative for constraining the latter to a safe rate of extension.

6. An arrangement such as claimed in claim 4, said arrangement further including means mounted in said aircraft and operative, upon extension of said first means, for stopping the same in its fully extended position.

7. An arrangement such as claimed in claim 4, said arrangement further including means connected to said aircraft and to said first means and operative for stopping the latter, upon extension thereof, in its fully extended position and for bracing the same in said fully extended position.

8. An arrangement such as claimed in claim 4, said arrangement further including means connected to said aircraft and to said first means and operative, during extension of the latter, for constraining the same to a safe rate of extension and for stopping and bracing said first means in the fully extended position thereof.

9. In combination with an aircraft provided with a power plant for propelling said aircraft at supersonic speeds and with a duct for supplying air to said power plant, said duct having structure completely bounding all of a passageway in said duct and a ram inlet into said passageway, said duct further having a connection with said power plant, a duct airflow stabilizing apparatus comprising: a body additional to said structure and mounted on said aircraft, said body being movable relative thereto to a first position wherein it lies substantially flush with an exterior surface of said aircraft and to a second position wherein it extends into airflow within the projected area of said inlet opening; and means selectively operative for eventuating movement of said body from said first to said second position, said means being connected to said body at least while said body is in said first position, whereby said body permits maximum airflow into said inlet opening when said body is in said first position, movement of said body to said second position being accompanied by the appearance of a normal shock wave upstream of said inlet opening, a slowing of airflow to subsonic speeds at said normal shock wave, and spillage of air around said inlet opening in sufficient quantity to prevent excessive airflow instabilities in said duct.

10. An apparatus such as claimed in claim 9, said body being pivotally mounted on said aircraft and comprising at least one member of bar-like character.

11. An apparatus such as claimed in claim 9, said body being pivotally mounted on said aircraft and of generally plate-like character.

12. An apparatus such as claimed in claim 9, said body being pivotally mounted on said aircraft, of generally plate-like character, and provided with openings communicating, when said body is extended, with an upstream surface and with a downstream surface of said body.

13. For an aircraft provided with a power plant for the supersonic propulsion thereof and with a duct for supplying air to said power plant, said duct having a wall completely defining all of a ram inlet opening into a passageway extending through said duct to said power plant, a duct airflow stabilizing apparatus comprising, in combination with said duct: means for spilling air about and upstream of said ram inlet opening during supersonic flight of said aircraft, said means being of separate identity from said wall and including a plurality of bar-like bodies hinged on said aircraft and pivotable together to a first position wherein said bodies lie substantially flush with an exterior surface of said aircraft and wherein spillage effected thereby is substantially zero, said bodies further being pivotable together to a second position characterized by extension of said bar-like bodies into airflow within the projected area of said inlet opening and wherein, during supersonic flight, spillage produced thereby is at a maximum; and means for selectively effecting movement together of said bar-like bodies between said first and second positions thereof, said means being connected to said bar-like bodies in both of said positions of said bodies; whereby said bar-like bodies permit maximum airflow into said inlet opening when moved together to their said first position, movement of said bar-like bodies to their said second position being accompanied by the appearance of a normal shock wave upstream of said inlet opening, a slowing of airflow to subsonic speeds at said normal shock wave, and spillage of air upstream of said duct in sufficient quantity to prevent airflow instabilities in said duct.

14. In combination with an aircraft provided with a power plant for propelling said aircraft at supersonic speeds and with a duct for supplying air to said power plant, said duct having a wall completely defining all of a ram inlet opening and a passage extending through said duct to said power plant, an apparatus comprising: means for spilling air about and upstream of said ram inlet opening during supersonic flight of said aircraft, said means being of separate identity from said wall and including a plurality of elongated bodies mounted on said aircraft and collectively movable relative thereto to a first position wherein said bodies lie substantially outside airflow approaching, entering and passing through said duct and wherein spillage effected by said means is substantially zero, said plurality of elongated bodies further being movable together to a second position characterized by extension of said bodies into airflow within the projected area of said inlet opening of said duct and in which, during supersonic flight, spillage produced by said means is at a maximum; said means further including at least one elongated member extending substantially transversely of and rigidly connecting said plurality of elongated bodies; and means operative for selectively effecting movement together of said plurality of elongated bodies between said first and second positions thereof said means being connected to said plurality of elongated bodies in both of said positions of said bodies; whereby said plurality of elongated bodies and said at least one elongated member permit maximum airflow into said inlet opening when said plurality of elongated bodies are moved together to said first position thereof, movement of said plurality of elongated bodies to said second position thereof being accompanied by the appearance of a normal shock wave upstream of said inlet opening, a slowing of airflow to subsonic speeds relative to said duct at said normal shock wave, and spillage of air upstream of said duct in sufficient quantity to prevent excessive airflow instabilities within said duct.

15. In combination with an aircraft provided with a power plant for propelling said aircraft at supersonic speeds and with a duct for supplying air to said power plant, said duct having a passage connected with said power plant, an aircraft braking and duct airflow stabilizing apparatus comprising: structure completely bounding said passage and a ram air inlet opening into said passage; means for engendering a normal shock wave well upstream of and across said inlet opening said means being of separate identity from said structure completely bounding said inlet opening and passage and being mounted on said aircraft, said means being movable relative to said structure to an extended position, said opening, when said means is in said extended position, having a projected area into which at least some of said means extends; and means for effecting extension of said means first mentioned into the projected area of said inlet opening for impingement on airflow adjacent said opening during supersonic flight of said aircraft, whereby, when said first-mentioned means is extended, airflow is reduced to subsonic speeds at said normal shock wave, spillage of air around said inlet opening reduces massflow into said duct below a value capable of supporting excessive duct flow instabilities, and braking forces attributable to said normal shock wave and air spillage are imposed upon said aircraft.

16. In combination with an aircraft having means for propelling said aircraft at supersonic speeds: a duct for supplying air to said means for propelling said aircraft, said duct having connection with said means for propelling said aircraft; structure of said duct bounding all of a passage within said duct and a ram inlet opening into said passage; a body of separate identity from and movable relative to said structure to a first position wherein said body lies substantially outside airflow passing through said duct and to a second position wherein said body extends athwart and lies at least in substantial part within said passage, said body being mounted on said aircraft; and means operative for selectively effecting movement of said body between said first and second positions thereof, said means having connection with said body, whereby said body, when in said first position thereof, permits maximum airflow into said inlet opening, and movement of said body to said second position thereof is accompanied by the appearance of a normal shock wave upstream of said inlet opening, a slowing of airflow to subsonic speeds at said normal shock wave, and spillage of air upstream of said duct in quantity sufficient to stabilize airflow within said duct.

17. For an aircraft having means for propelling said aircraft at supersonic speeds and provided with a duct for supplying air to said means for propelling said aircraft, said duct having a connection with said means for propelling said aircraft a duct airflow stabilizing apparatus comprising: structure completely defining a ram inlet opening into said duct; means for engendering a normal shock wave well upstream of at least most of said inlet opening, said means being of separate identity from said structure defining said inlet opening and including a body mounted on said aircraft and movable relative thereto to a first position wherein said body lies substantially outside airflow adjacent said inlet opening and to a second position wherein said body impinges on airflow adjacent said opening, said opening, when said body is in said second position, having a projected area into which at least some of said body extends; and means operative for effecting movement of said body between said first and second positions, whereby said body, when in said first position, permits maximum airflow into said inlet opening, and movement of said body to said second position is accompanied by the appearance of a normal shock wave upstream of at least most of said inlet opening, a slowing of airflow to subsonic speeds at said normal shock wave, and spillage of air upstream of said duct about said inlet opening in quantity sufficient to stabilize airflow within said duct.

18. For an aircraft provided with a power plant for the supersonic propulsion thereof and with a duct for supplying air to said power plant, said duct having structure completely defining all of a ram inlet opening into and a passageway extending through said duct to said power plant, an apparatus comprising, in combination with said duct: means for spilling air about and upstream of said ram inlet opening during supersonic flight of said aircraft, said means being of separate identity from said structure and movable between a first position wherein spillage effected thereby is substantially zero and a second position wherein, during supersonic flight, spillage produced thereby is at a maximum, said means being carried by said aircraft; and means for eventuating movement of said first mentioned means from said first to said second position and connected to said first-mentioned means at least while the latter is in said first position.

19. A duct airflow stabilizing apparatus such as claimed in claim 1, said means for effecting extension of said first-mentioned means into the projected area of said inlet opening, when said aircraft is in supersonic flight, for impingement on airflow adjacent said inlet opening being operative for effecting retraction of said first-mentioned means to a position characterized by a reduction in the extension thereof into the projected area of said inlet opening.

20. In combination with an aircraft provided with an engine for propelling said aircraft at supersonic speeds and with a duct communicating with said engine for supplying air thereto, means completely defining an inlet opening into and passageway within said duct; a dive brake of separate identity from said means, said dive brake being mounted on said aircraft and extendible therefrom into airflow adjacent said opening, said opening, when said dive brake is extended, having a projected area into which at least some of said dive brake extends, said dive brake being retractable to a position substantially outside said projected area of said inlet opening; and positioning means operable for selectively effecting extension and retraction of said dive brake, said positioning means being connected to said dive brake and said dive brake being extendible to a position wherein it induces a normal shock wave located upstream of said inlet opening by a distance sufficient to ensure a substantial spillage of said airflow downstream of said normal shock wave and outside said projected area of said inlet opening.

21. In a method of controlling airflow for imposing braking forces on an aircraft adapted to operate through air of relative supersonic velocity, said aircraft including a forwardly facing ram air inlet opening communicating with and supplying air to a propulsive power plant supplied in said aircraft, the step comprising: reducing airflow into and increasing air spillage about said inlet opening by introducing into airflow adjacent said inlet opening a body inducing a normal shock wave across the projected area and sufficiently upstream of said opening to ensure a considerable spillage of airflow outside the projected area of said opening upstream of the latter.

22. In a method for preventing excessive instabilities of airflow in and about a duct having a forwardly facing inlet opening and provided on an aircraft adapted to operate through air of relative supersonic velocity and having an engine receiving air from said duct, said engine having an air demand subject to relative reduction below a critical point at which said duct is liable to experience excessive instabilities of airflow, the step accomplished prior to any reduction of the engine air demand below the critical point and comprising: modifying airflow into and adjacent said inlet opening by introducing into airflow adjacent said inlet opening a body inducing a normal shock wave across the projected area and sufficiently upstream of said opening to ensure a considerable spillage of airflow outside the projected area and upstream of said opening.

23. In a method for stopping excessive instabilities of airflow in and about a duct having a forwardly facing inlet opening provided on an aircraft adapted to operate through air of relative supersonic velocity and having an engine receiving air from said duct, said instabilities having arisen in consequence of a relative reduction in the air demand of said engine below a critical point at which said duct is susceptible to excessive instabilities of airflow, the step comprising: modifying airflow into and adjacent said inlet opening by introducing into airflow adjacent said inlet opening a body introducing a normal shock wave across the projected area and sufficiently upstream of said opening to ensure a considerable spillage of airflow outside the projected area and upstream of said opening.

24. In a method of controlling airflow into and about a duct having a forwardly facing inlet opening provided on an aircraft adapted to operate through air of relative supersonic velocity and having an engine receiving air from said duct, the step comprising: modifying airflow into and adjacent said inlet opening by introducing into airflow adjacent said inlet opening a body inducing a normal shock wave across the projected area and sufficiently upstream of said opening to ensure a considerable spillage of airflow outside the projected area and upstream of said opening.

(References on following page)

References Cited in the file of this patent

UNITED STATES PATENTS

| | | |
|---|---|---|
| 1,553,249 | Le Grain | Sept. 8, 1925 |
| 2,369,859 | Sargent | Feb. 20, 1945 |
| 2,382,016 | Love | Aug. 14, 1945 |
| 2,573,834 | Davidson | Nov. 6, 1951 |
| 2,694,357 | Lee | Nov. 16, 1954 |
| 2,699,906 | Lee et al. | Jan. 18, 1955 |
| 2,737,019 | Billman | Mar. 6, 1956 |
| 2,755,040 | Pinkos et al. | July 17, 1956 |
| 2,790,304 | Besserer | Apr. 30, 1957 |

FOREIGN PATENTS

| | | |
|---|---|---|
| 607,686 | Great Britain | Sept. 3, 1948 |
| 1,071,234 | France | Mar. 3, 1954 |